(12) United States Patent
Neumann

(10) Patent No.: US 11,681,755 B2
(45) Date of Patent: *Jun. 20, 2023

(54) METHODS AND SYSTEMS FOR SELECTING AN ALIMENTARY TRANSFER DESCRIPTOR USING CATEGORICAL CONSTRAINTS

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 229 days.

This patent is subject to a terminal disclaimer.

(21) Appl. No.: 17/106,408

(22) Filed: Nov. 30, 2020

(65) Prior Publication Data

US 2021/0081458 A1 Mar. 18, 2021

Related U.S. Application Data

(63) Continuation-in-part of application No. 16/430,397, filed on Jun. 3, 2019, now Pat. No. 10,915,581.

(51) Int. Cl.
*G06F 16/9032* (2019.01)
*G06N 20/00* (2019.01)

(52) U.S. Cl.
CPC ....... *G06F 16/90328* (2019.01); *G06N 20/00* (2019.01)

(58) Field of Classification Search
CPC .................. G06F 16/90328; G06N 7/005
See application file for complete search history.

(56) References Cited

U.S. PATENT DOCUMENTS 7,297,109 B2 11/2007 Brown
8,731,970 B2 5/2014 Hermann et al.
(Continued)

OTHER PUBLICATIONS

PR Newswire; Apr. 23, 2019; https://dialog.proquest.com/professional/docview/2212576748?accountid=157282; New Italian Takeout & Delivery Concept, Anthony's Pronto Kitchen, Goes All-In With Food Delivery Apps: Uber Eats, Door Dash, Grub Hub and Delivery Dudes: Italian takeout and delivery-only concept, Anthony's Pronto Kitchen, expands delivery options for consumers in east Fort Lauderdale and introduces free Pronto delivery for orders over $50.

*Primary Examiner* — Reginald R Reyes
(74) *Attorney, Agent, or Firm* — Caldwell Intellectual Property Law

(57) ABSTRACT

A system and method for grouping alimentary transfer descriptors as a function of user elements includes receiving at least an alimentary transfer descriptor as a function of an alimentary transfer request, identifying at least a user element, determining a categorical constraint as a function of the user element, generating a plurality of groupings, wherein each grouping comprises alimentary transfer descriptors, selecting a grouping of the plurality of groupings, wherein selecting further comprises, executing a selection function on the plurality of groupings, wherein the selection function generates a selection output as a function of the plurality of selection criteria and the plurality of groupings, and selecting the grouping based on the selection output, and transmitting the a notification to a physical performance entity as a function of the selected grouping.

18 Claims, 10 Drawing Sheets

(56) References Cited

U.S. PATENT DOCUMENTS

| | | |
|---|---|---|
| 2003/0208409 A1 | 11/2003 | Mault |
| 2005/0004843 A1 | 1/2005 | Heflin |
| 2006/0199155 A1 | 9/2006 | Mosher |
| 2010/0241454 A1* | 9/2010 | Firminger ............... G16H 50/20 715/833 |
| 2013/0224694 A1 | 8/2013 | Moore et al. |
| 2013/0268317 A1 | 10/2013 | Mattila |
| 2015/0079551 A1 | 3/2015 | Egan |
| 2015/0279234 A1 | 10/2015 | Chernenko |
| 2016/0078571 A1 | 3/2016 | Singh |
| 2016/0253922 A1 | 9/2016 | Kremen et al. |
| 2017/0091880 A1 | 3/2017 | Krishnan et al. |
| 2017/0316352 A1* | 11/2017 | Abujbara ................ G06Q 50/12 |
| 2018/0001184 A1* | 1/2018 | Tran ........................... G06F 3/00 |
| 2018/0165747 A1 | 6/2018 | Patten et al. |
| 2019/0205999 A1* | 7/2019 | Gutnik ................... G06Q 50/01 |

\* cited by examiner

METHODS AND SYSTEMS FOR SELECTING AN ALIMENTARY TRANSFER DESCRIPTOR USING CATEGORICAL CONSTRAINTS

CROSS-REFERENCE TO RELATED APPLICATIONS

This application is a continuation-in-part of Non-provisional application Ser. No. 16/430,397 filed on Jun. 3, 2019 and entitled "METHODS AND SYSTEMS FOR SELECTING AN ALIMENTARY TRANSFER DESCRIPTOR USING CATEGORICAL CONSTRAINTS," the entirety of which is incorporated herein by reference.

FIELD OF THE INVENTION

The present invention generally relates to the field of network communication. In particular, the present invention is directed to selecting an alimentary transfer descriptor using categorical constraints.

BACKGROUND

Efficient routing of instructions for physical performance of actions via network communication remains an elusive goal. Particularly where such actions include transfer of items of an alimentary nature, where multiple issues of timing, speed, quality, and necessity affect the choice in question, selection and communication processes often fall short of ideal solutions.

SUMMARY OF THE DISCLOSURE

In one aspect, a system for selecting an alimentary transfer descriptor using categorical constraints includes a process selection device, the process selection device designed and configured to receive an at least an alimentary transfer descriptor as a function of an alimentary transfer request, identify at least a user element, determine a categorical constraint as a function of the user element, and generate a plurality of groupings, wherein each grouping comprises alimentary transfer descriptors. The system includes a descriptor generator module operating on the process selection device, the descriptor generator module designed and configured to generate a plurality of alimentary transfer descriptors, wherein each alimentary transfer descriptor describes a physical transfer process, of a plurality of physical transfer processes, to be performed by a corresponding physical performance entity of a plurality of physical performance entities, each alimentary transfer descriptor describes an alimentary collation to be provided during a corresponding physical transfer process, and each alimentary transfer descriptor further includes a plurality of attributes, each attribute corresponding to a selection criterion of a plurality of selection criteria. The system includes a notifier module operating on the process selection device, the notifier module designed and configured to transmit a notification to the physical performance entities, wherein transmitting further comprises executing a selection function on the plurality of groupings, wherein the selection function generates a selection output as a function of the plurality of selection criteria and the plurality of groupings, selecting the grouping based on the selection output, and transmitting the notification to a physical performance entity as a function for the selected grouping.

In another aspect, a method for selecting an alimentary transfer descriptor using categorical constraints includes receiving, by a process selection device, at least an alimentary transfer descriptor as a function of an alimentary transfer request, identifying, by the process selection device, at least a user element, determining, by the process selection device, a categorical constraint as a function of the user element, generating, by the process selection device, a plurality of groupings, wherein each grouping comprises alimentary transfer descriptors, selecting, by the process selection device, a grouping of the plurality of groupings, wherein selecting further comprises, executing a selection function on the plurality of groupings, wherein the selection function generates a selection output as a function of the plurality of selection criteria and the plurality of groupings, and selecting the grouping based on the selection output, and transmitting, by the process selection device, the a notification to a physical performance entity as a function of the selected grouping.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of disclosed systems and methods select processes for transfer of alimentary collations, and entities to effect physical performance thereof, by reference to a selection function accounting for multiple attributes of such processes and/or entities. Loss function analysis may balance factors; this may be done by reference to an iteratively generated expression of preferential allocations of such attributes, for instance by using machine-learning processes to acquire accurate pictures of user preferences.

Figure 1:
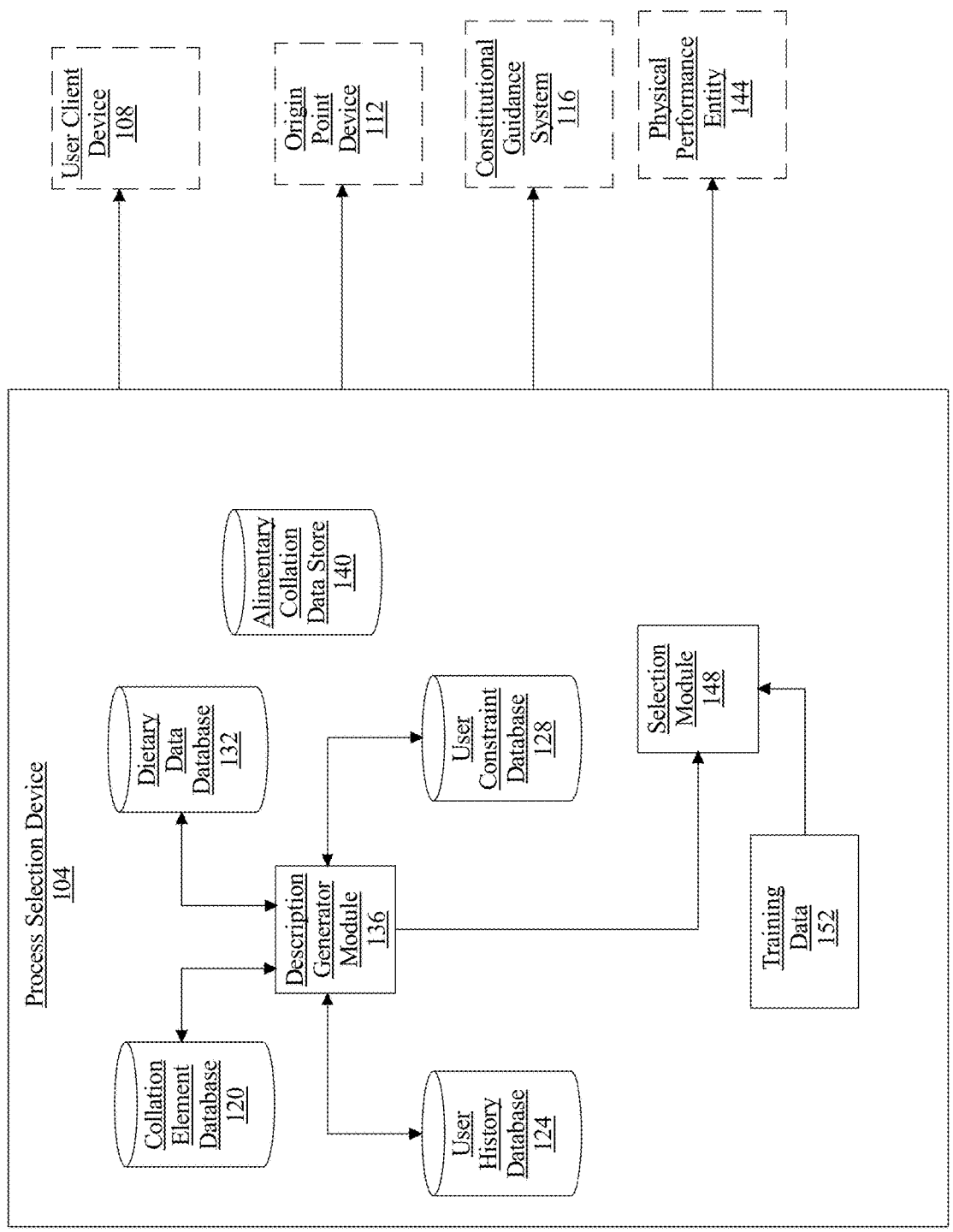
FIG. 1 is a block diagram illustrating an exemplary embodiment of a system for selecting an alimentary transfer descriptor using categorical constraints.

Referring now FIG. 1, an exemplary embodiment of a system 100 for selecting an alimentary transfer descriptor using categorical constraints is illustrated. System 100 includes a process selection device 104. Process selection device 104 may include any computing device as described below in reference to FIG. 10, including without limitation a microcontroller, microprocessor, digital signal processor (DSP) and/or system on a chip (SoC) as described below in reference to FIG. 10. Process selection device 104 may be housed with, may be incorporated in, or may incorporate one or more sensors of at least a sensor. Computing device may include, be included in, and/or communicate with a mobile device such as a mobile telephone or smartphone. Process selection device 104 may include a single computing device operating independently, or may include two or more computing device operating in concert, in parallel, sequentially or the like; two or more computing devices may be included together in a single computing device or in two or more computing devices. Process selection device 104 with one or more additional devices as described below in further detail via a network interface device. Network interface device may be utilized for connecting a process selection device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Process selection device 104 may include but is not limited to, for example, a process selection device 104 or cluster of computing devices in a first location and a second computing device or cluster of computing devices in a second location. Process selection device 104 may include one or more computing devices dedicated to data storage, security, distribution of traffic for load balancing, and the like. Process selection device 104 may distribute one or more computing tasks as described below across a plurality of computing devices of computing device, which may operate in parallel, in series, redundantly, or in any other manner used for distribution of tasks or memory between computing devices. Process selection device 104 may be implemented using a "shared nothing" architecture in which data is cached at the worker, in an embodiment, this may enable scalability of system 100 and/or computing device.

Still referring to FIG. 1, process selection device 104 and/or one or more modules operating thereon may be designed and/or configured to perform any method, method step, or sequence of method steps in any embodiment described in this disclosure, in any order and with any degree of repetition. For instance, process selection device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Process selection device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, process selection device 104 is designed and configured to receive, from a user device 108, an alimentary transfer request, wherein an alimentary transfer request is described in detail below, in reference to FIG. 2. User device 108 may include any device or devices suitable for use as process selection device 104, as described above. An "alimentary transfer request," as used in this disclosure, is an element of data describing an alimentary collation that a user wishes to have physically transferred to the user from a location other than location at which the user is currently located, by action of a physical performance entity 144. As used herein, an "alimentary collation" is a physical item including at least a first alimentary element, and at least one of (1) at least an act of preparation of the at least a first alimentary element and/or (2) at least a second alimentary element. As a non-limiting example, first alimentary element may include an ingredient, such as an ingredient in a dish, at least an act of preparation may include cooking, dressing, marinating, and/or any other food or beverage preparation process for preparing the dish, and at least a second alimentary element may include an additional ingredient in the dish, which may include flavoring, seasoning, sauces, and/or any comestible product that may be used as an ingredient in a dish. An alimentary collation may include, without limitation, a restaurant meal, a frozen or otherwise pre-made meal, or a set of ingredients to make a meal. An alimentary transfer request includes at least a description of an alimentary collation; at least a description may include, without limitation, an allusion to a label identifying the alimentary collation, to one or more data identifying elements of the alimentary collation, and/or a full description of all elements and/or preparation instructions and/or descriptions of or pertaining to the alimentary collation. An alimentary transfer request includes at least a terminal location, where a "terminal location," as used in this disclosure, is defined as a location to which an alimentary collation is to be physically transferred; as a non-limiting example, an alimentary transfer request may include, as a terminal location, a current or likely future location of a user submitting the request, and a description of a dish, meal, set of ingredients, or the like which the user is requesting be physically transferred to the terminal location. A "physical performance entity 144," as described herein, is an entity that performs a physical transfer of an alimentary collation as described above; physical transfer may be effected using pedestrian and/or vehicle delivery, parcel delivery, or any other process for physically transferring an alimentary collation from a first location to a second location that may occur to a person skilled in the art upon reviewing the entirety of this disclosure.

In an embodiment, and still referring to FIG. 1, process selection device 104 may be configured to receive an alimentary transfer request by receiving data making up the alimentary transfer request from user device 108. For instance, user device 108 may be provided with a user interface including, without limitation, listing of potential alimentary collations and/or ingredients therein; listing may be interactive, for instance permitting one or more data inputs selecting and/or referring to list elements. As a non-limiting example, a list presented to user may include a menu listing partially or wholly pre-designed alimentary collations, a menu listing options such as ingredients and/or preparation instructions to be combined into one or more alimentary collations upon selection by a user, or the like. A user interface may alternatively or additionally provide one or more options a user may select for physical transfer processes, including terminal locations, desired arrival times at terminal locations, or the like. User interface may be provided, without limitation by process selection device 104 and, an origin point device 112, and/or a device, which may be any device suitable for use as a user device 108, operated by a physical transfer entity, where an "origin point device 112" is a device operated by an entity that assembles or prepares alimentary collations; origin point device 112 may include any device suitable for use as a user device 108. A user may supply a textual description of alimentary transfer request and/or any element of and/or referred to by alimentary transfer request to process selection device 104 and/or an origin point device 112; textual description may be analyzed and/or compared to other data using a language processing module as described in further detail below. A user may alternatively or additionally place a telephone call or an in-person request with one or more entities operating a device such as user device 108.

Continuing to refer to FIG. 1, process selection device 104 may be configured to receive an alimentary instruction set from a constitutional guidance system 116. As used in this disclosure, a "constitutional guidance system 116" is a system that generates an alimentary instruction set. Constitutional guidance system 116 may operate on and/or be incorporated in process selection device 104; alternatively or additionally, constitutional guidance system 116 may be or operate on a remote device in communication with process selection device 104, for instance over a network such as the Internet. An "alimentary instruction set" as used in this disclosure is a data structure describing one or more alimentary suggestions provided to a user for constitutional guidance and intended to achieve an ameliorative result. Alimentary instruction set may, as a non-limiting example, contain instructions one or more daily, weekly, or other periodic dietary or nutritional needs, for instance as determined by a diagnostic process, to address one or more health-related issues such as conditions requiring specialized alimentary consumption patterns such as diabetes, celiac disease or the like, food allergies, weight-loss or other health goals, or the like. Alimentary instruction set may include instructions listing meals, foods, food groups, ingredients, supplements and the like that may be compatible with at least a dietary request and or diagnostic process; alimentary instruction set may alternatively or additionally list daily or periodic nutritional goals and/or limits, such as without limitation daily allowances and or recommendations of salt, sugar, fat, saturated fat, protein, dietary fiber or the like. For example, alimentary instruction set may include a list of three possible meals that may be compatible with at least a dietary request for a dairy free diet. In yet another non-limiting example, alimentary instruction set may include food groups compatible with at least a dietary request such as a dietary request for a paleo diet may include recommendations as to food groups that are compatible including meats, fish, poultry, fats, vegetables, and fruits. For example, at least a dietary request and/or diagnostic result containing a request for a dairy free diet may be utilized to generate an alimentary instruction set that includes a suggestion for breakfast that includes oatmeal topped with coconut milk. In yet another non-limiting example, at least a dietary request for a vegetarian diet may be utilized to generate an alimentary instruction set that includes a meal containing tofu, spinach, and rice. In an embodiment, alimentary instruction set generator module may be configured to modify alimentary instruction set as a function of the at least a user entry as described in more detail below. Persons skilled in the art, upon reviewing the entirety of this disclosure, will be aware of various elements that may be included in an alimentary instruction set as described in this disclosure.

In an embodiment, and still referring to FIG. 1, process selection device 104 may be configured to modify a user-selected alimentary collation, for instance selected during a user entry of an alimentary transfer request as described above, as a function of an alimentary instruction set. In an embodiment, process selection device 104 may compare elements of an alimentary collation selected by a user to one or more collations and/or ingredients listed in alimentary instruction set; in an embodiment, the selected alimentary collation may unambiguously list ingredients and/or collations that may directly be compared to ingredients and/or collations listed in alimentary instruction set. Alternatively or additionally, process selection device 104 may compare requested alimentary collation to alimentary instruction set through use of one or more additional elements. For instance, and without limitation, system 100 may include a collation element database 120 linking alimentary collations to component elements. A collation element database 120 may include any data structure for ordered storage and retrieval of data, which may be implemented as a hardware or software module. A collation element database 120 may be implemented, without limitation, as a relational database, a key-value retrieval datastore such as a NOSQL database, or any other format or structure for use as a datastore that a person skilled in the art would recognize as suitable upon review of the entirety of this disclosure. A collation element database 120 may include a plurality of data entries and/or records corresponding to alimentary collations as described above. Data entries and/or records may describe, without limitation, data describing one or more potential ingredient sets and/or preparation processes associated with an alimentary collation. Data entries in a collation element database 120 may be flagged with or linked to one or more additional elements of information, which may be reflected in data entry cells and/or in linked tables such as tables related by one or more indices in a relational database; one or more additional elements of information may include data describing regional, geographic, and/or other extant variations in ingredients and/or preparation techniques relating to listed alimentary collations. Persons skilled in the art, upon reviewing the entirety of this disclosure, will be aware of various ways in which data entries in a collation element database 120 may reflect categories, cohorts, and/or populations of data consistently with this disclosure.

Figure 2:
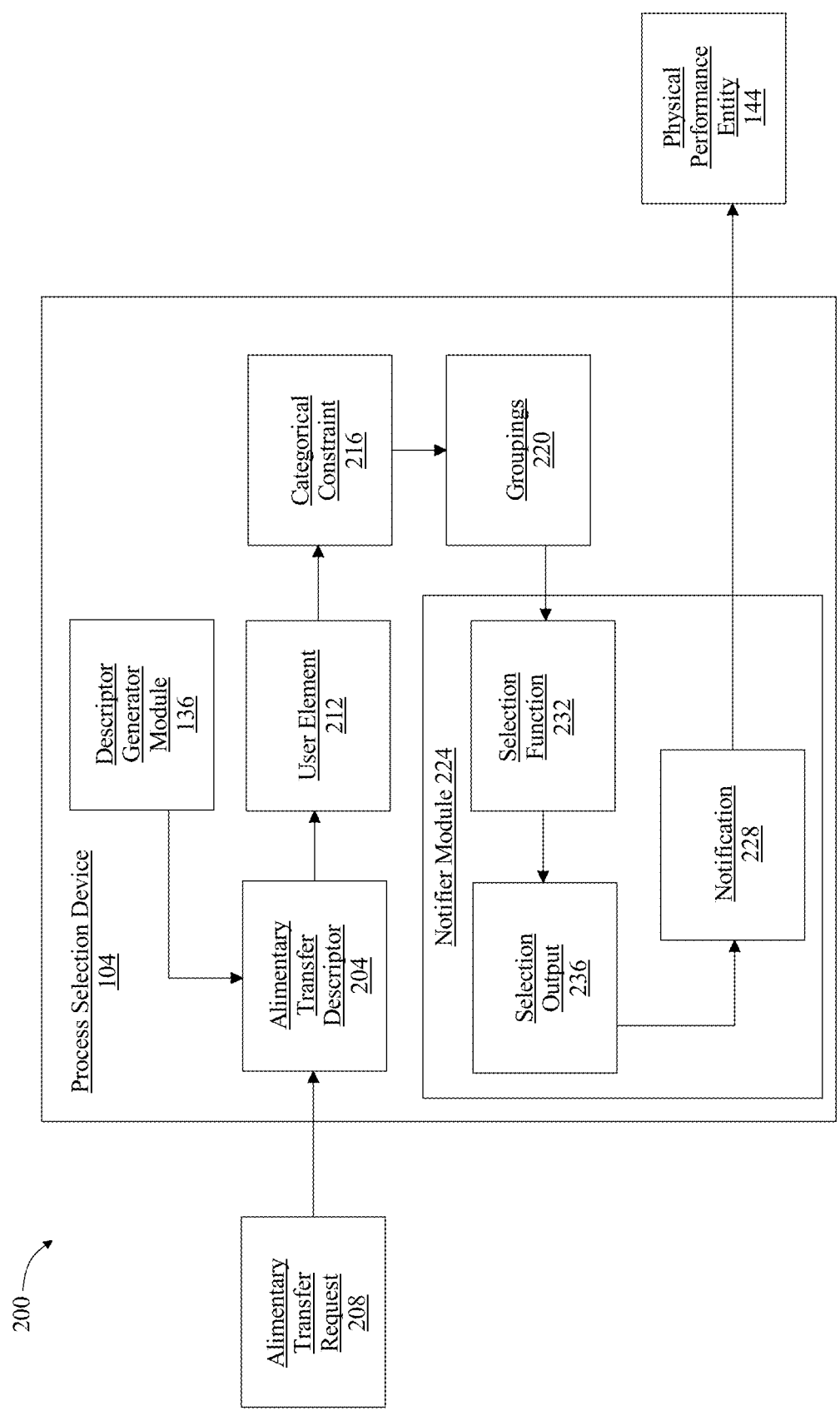
FIG. 2 is a block diagram illustrating an exemplary embodiment of a system for grouping alimentary transfer descriptors as a function of user elements.

Referring now to FIG. 2, an exemplary embodiment of a system 200 for grouping alimentary transfer descriptors as a function of user elements is illustrated. System 200 includes at least a process selection device 104, wherein process selection device 104 may include any process selection device 104 as described above in reference to FIG. 1. Process selection device 104 is configured to receive at least an alimentary transfer descriptor 204, wherein "alimentary transfer descriptor" may include any alimentary transfer descriptor as described above in detail, in reference to FIG. 1. For example, and without limitation alimentary transfer descriptor 204 may describe an alimentary collation as producible by an entity physically capable of producing alimentary collations and/or at least a parameter of a physical transfer process bringing the alimentary collation to the terminal location specified in a corresponding alimentary transfer request, wherein alimentary collations are described in further detail below. As a non-limiting example an alimentary transfer descriptor may include at least an aliment that is marketed for sale by a producer and/or an aliment that at least may be transferred by a physical transfer process. Alimentary transfer descriptor 204 may be received by at least an alimentary transfer request 208, wherein "alimentary transfer request" is described above in detail, in reference to FIG. 1, and is an element of data describing an alimentary collation that a user wishes to have physically transferred to the user from a location other than location at which the user is currently located, by action of a physical performance entity 144.

Still referring to FIG. 2, user element 212 may be identified as a function of receiving at least a vital input from a monitoring device. As used in this disclosure "vital input" is datum that indicates the vital status of the user. As a non-limiting example, vital input may consist of at least datum relating to a heart rate, pulse, blood pressure, BMI, respiratory rate, sleep cycle, physical activity level, fitness level, and the like thereof. As used in this disclosure a "monitoring device" is a device that at least collects, stores, and/or transmits data that pertains to a user vital status. A monitoring device may include, without limitation, smart watches, smart jewelry, accessories, clothing, fabric, and the like thereof. A monitoring device may convey at least datum associated with one or more measures of health of a person's body, one or more systems within a person's body such as a integumentary system, a skeletal system, a muscular system, a nervous system, an endocrine system, a cardiovascular system, a urinary system, a respiratory system, a lymphatic system, a digestive system, a reproductive system, or the like, one or more organs within a person's body, and/or any other subdivision of a person's body useful for diagnostic or prognostic purposes. As a non-limiting example, a monitoring device may indicate the heart rate of the user. As a further non-limiting example, the monitoring device may indicate the blood pressure of the user. Process selection device 104 may determine a vital vector as a function of the at least vital input. As used in this disclosure a "vital vector" is a measurable value that at least determines an impact magnitude related to the vital input. As a non-limiting example a vital vector of 30 may be identified for a vital input relating to high blood pressure, wherein a vital vector of 20 may be identified for vital input relating to heart arrhythmias.

Still referring to FIG. 2, user element 212 may be identified as a function of the vital vector and a vital machine-learning model. As used in this disclosure a "vital machine-learning model" is a mathematical and/or algorithmic representation of a relationship between inputs and outputs. The vital machine-learning model may be generated using a vital machine-learning process that uses training data and/or training set to generate an algorithm that will be performed by process selection device 104 to produce outputs given data provided as inputs; this is in contrast to a non-machine learning software program where the commands to be executed are determined in advance by a user and written in a programming language. A vital machine-learning process may include any supervised, unsupervised, or reinforcement machine-learning process that process selection device 104 may or may not use in the determination of user element 212. A vital machine-learning process may include, without limitation, machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. A vital machine-learning process may be trained as a function of a vital training set. As used in this disclosure "vital training set" is a training set that correlates at least a vital vector, to at least a vital impact, wherein a vital impact is an effect that a condition, symptom, characteristic has on the user. For example, and without limitation a vital impact may include reduced lifespan, shortness of breath, reduced physical capabilities, excessive respiratory rate and the like thereof. Vital training set may be received as a function of user-entered valuations of vital vectors and/or vital impacts. Vital training set may be received by one or more past iterations of the previous user elements. Vital training set may be received by one or more remote devices that at least correlate a vital vector to a vital impact, wherein a remote device is an external device to process selection device 104.

Still referring to FIG. 2, process selection device 104 is configured to determine a categorical constraint 216 as a function of user element 212. A "categorical constraint," as used in this disclosure, is a constraint limiting a choice of an alimentary collation and/or an element thereof. Categorical constraint 216 may include at least a limitation that is determined by one or more diagnosis by an informed advisor including a functional medicine doctor, an allergy or food sensitivity issue that at least limits the alimentary collation that may be transmitted to the user. Categorical constraint 212 may be determined as a function of one or more medications and/or supplements that contradict a medication or supplement that the user may be taking. For example, a user diagnosed with a hypercholesteremia and currently taking a cholesterol lowering medication such as a statin may report a restriction that includes an inability to consume grapefruit containing foods and food products.

Still referring to FIG. 2, categorical constraint 216 may be identified by determining at least a categorical qualifier as a function of user element 212. As used in this disclosure a "categorical qualifier" is a sign, symptom, and/or trait that is identified as a function of at least the user element. For example, and without limitation, a categorical qualifier may include a restricted glucose level as a function of one or more user elements that relate to diabetes. Categorical constraint 216 may be identified as a function of categorical qualifier and one or more categorical machine-learning models. As used in this disclosure a "categorical machine-learning model" is a mathematical and/or algorithmic representation of a relationship between inputs and outputs. The categorical machine-learning model may be generated using a categorical machine-learning process that uses training data and/or training set to generate an algorithm that will be performed by process selection device 104 to produce outputs given data provided as inputs; this is in contrast to a non-machine learning software program where the commands to be executed are determined in advance by a user and written in a programming language. A categorical machine-learning process may include any supervised, unsupervised, or reinforcement machine-learning process that process selection device 104 may or may not use in the determination of categorical constraint 216. A categorical machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. A categorical machine-learning process may be trained as a function of a categorical training set. As used in this disclosure "categorical training set" is a training set that correlates at least a vital comparator, to at least a categorical qualifier, wherein a vital comparator is a list of signs, symptoms and/or conditions that have been identified. For example, and without limitation a vital comparator may include autoimmune disorders, medication interactions, bacterial infections, viral diseases, and the like thereof. Categorical training set may be received as a function of user-entered valuations of vital comparators and/or categorical qualifiers. Categorical training set may be received by one or more past iterations of the previous categorical constraints. Categorical training set may be received by one or more remote devices that at least correlate a vital comparator to a categorical qualifier, wherein a remote device is an external device to process selection device 104.

Still referring to FIG. 2, process selection device 104 is configured to generate a plurality of groupings 220. As used in this disclosure "groupings" are a set cluster of alimentary transfer descriptors that relate to one or more similarity qualifiers, wherein similarity qualifiers are categories that may be shared among one or more alimentary transfer descriptors. For example, and without limitation, a similarity qualifier may identify one or more categorical constraints that share the similarity of reduced saturated fat consumption. As a further non-limiting example a similarity qualifier may identify one or more categorical constraints that share the similarity of increased protein consumptions. Grouping 220 may be identified as a function of the similarity qualifier and at least a grouping machine-learning model. As used in this disclosure a "grouping machine-learning model" is a mathematical and/or algorithmic representation of a relationship between inputs and outputs. The grouping machine-learning model may be generated using a grouping machine-learning process that uses training data and/or training set to generate an algorithm that will be performed by process selection device 104 to produce outputs given data provided as inputs; this is in contrast to a non-machine learning software program where the commands to be executed are determined in advance by a user and written in a programming language. A grouping machine-learning process may include any supervised, unsupervised, or reinforcement machine-learning process that process selection device 104 may or may not use in the determination of grouping 220. A grouping machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. A grouping machine-learning process may be trained as a function of a grouping training set. As used in this disclosure "grouping training set" is a training set that correlates at least the similarity qualifier to at least a grouping element, wherein a grouping element is a component that at least identifies similar provisioners and physical transfer entities. For example, and without limitation, grouping training set may correlate a similarity qualifier of increased protein consumption to a provisioner that is a steakhouse. Grouping training set may be received as a function of user-entered valuations of similarity qualifiers and/or grouping elements. Grouping training set may be received by one or more past iterations of the previous groupings. Grouping training set may be received by one or more remote devices that at least correlate a similarity qualifier to a grouping element, wherein a remote device is an external device to process selection device 104. Additionally or alternatively, grouping training set may correlate a similarity qualifier of reduced saturated fat consumption to physical transfer entities that only transmit low saturated fat foods.

Still referring to FIG. 2, process selection device 104 includes at least a notifier module 224. As used in this disclosure "notifier module" is a component that at least transmits a notification 228 to physical performance entity 144, wherein a physical performance entity is described below in detail. As used in this disclosure a "notification" is a datum, signal, bit, and/or signal that at least conveys a message to the physical performance entity. The physical performance entity may include, without limitation, the physical transfer entity as well as a provisioner of the aliment. Notifier module 228 may execute a selection function 232 on the plurality of groupings 220, wherein a selection function is described in detail below. Selection function 232 may generate a selection output 236, as a function of selection criteria and the plurality of groupings. Selection criteria may include one or more degrees of variance from one or more groupings. For example, and without limitation selection function 232 may identify a degree of variance of 4 for a grouping associated with reducing heart rate. Notification 228 may be transmitted to physical performance entity 144 via a wireless telecommunication. The wireless communication signals may include, without limitation, radio waves, electric fields, mobile broadband, Wi-Fi, and/or the BLUETOOTH protocol promulgated by Bluetooth SIG, Inc. of Kirkland, Wash., wherein Bluetooth is a wireless technology used for exchanging data between fixed mobile devices over short distances using ultra high frequency radio waves between 2.402 GHz to 2.480 GHz.

Figure 3:
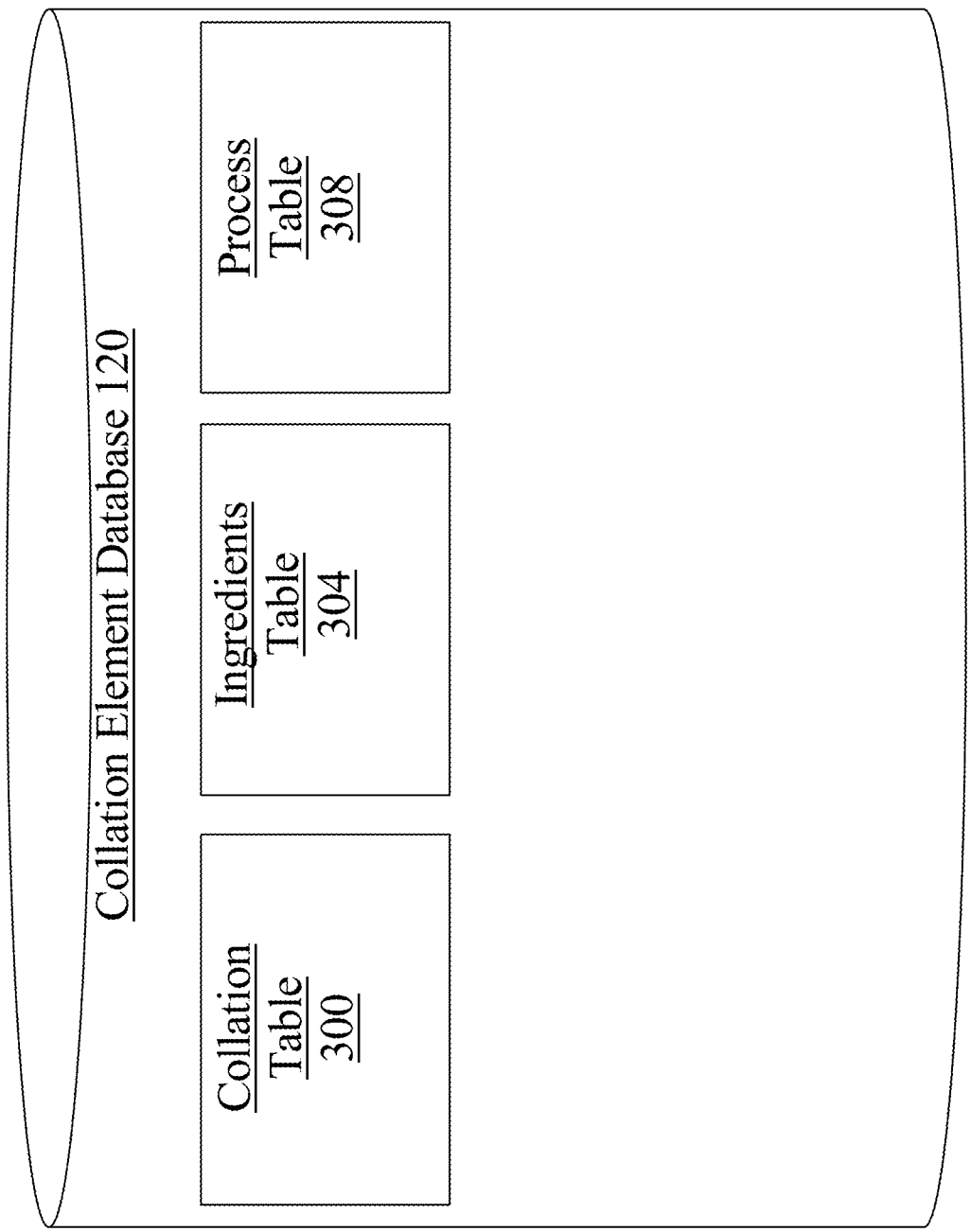
FIG. 3 is a block diagram illustrating an exemplary embodiment of a collation element database.
Figure 4:
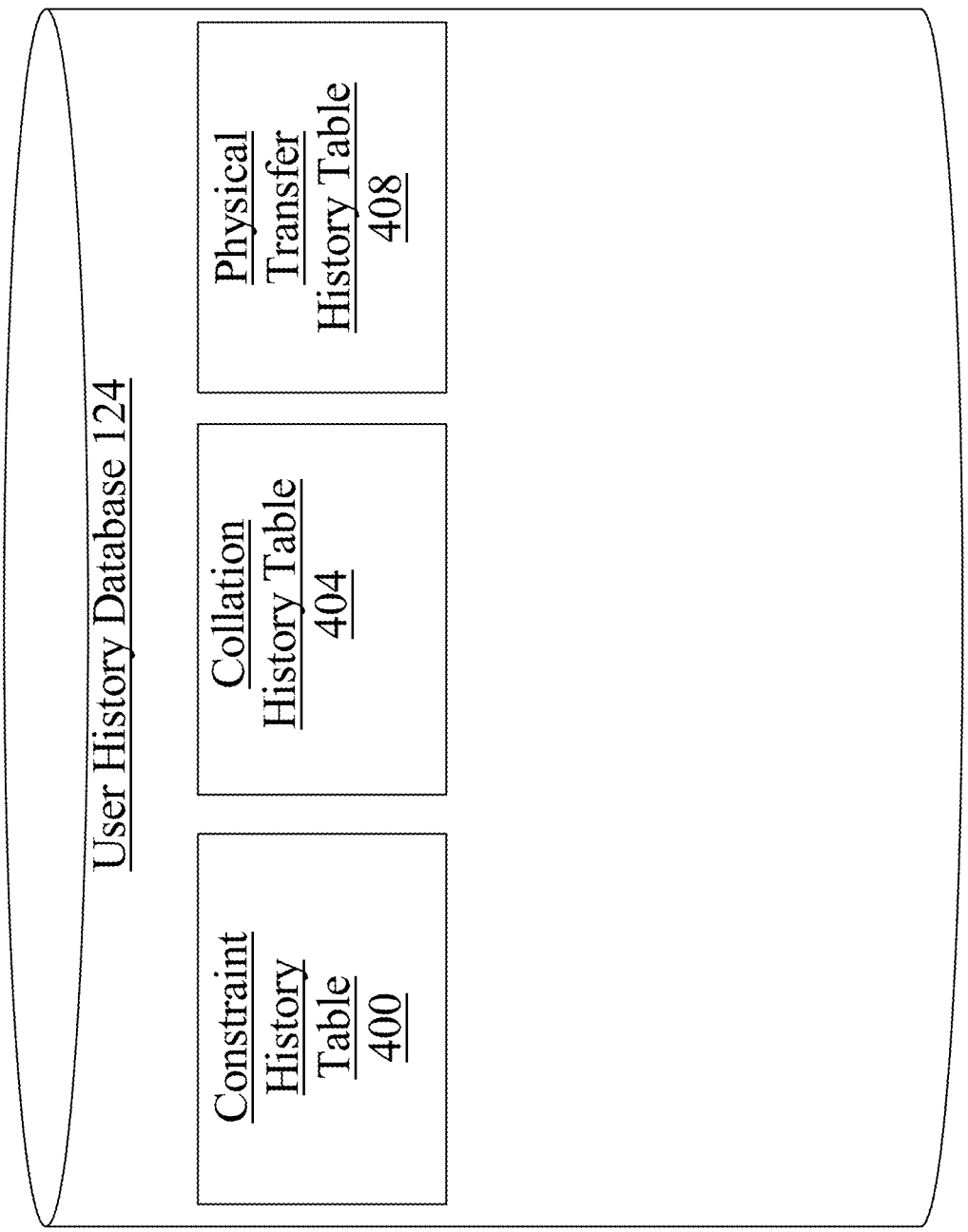
FIG. 4 is a block diagram illustrating an exemplary embodiment of a user history database.

Referring now to FIG. 3, one or more database tables in collation element database 120 may include, as a non-limiting example, a collation table 300; collation table 300 may list a plurality of collation names, and links to ingredients and/or processes involved in generating each collation. One or more database tables in collation element database 120 may include, as a non-limiting example, an ingredient table 304; ingredient table may list a plurality of ingredients that may be included in collations as listed in collation table 300. One or more database tables in collation element database 120 may include, as a non-limiting example, a collation process table 308; collation process table 308 may list processes for generation of collations, including without limitation cooking and other preparation procedures.

Referring again to FIG. 1, process selection device 104 may compare alimentary transfer request to alimentary instruction set by comparing one or more elements of textual data in alimentary transfer request to one or more elements of textual data in alimentary instruction set; comparison may be performed, for instance, using keyword matching and/or other forms of string comparison. Alternatively or additionally, textual comparison may be performed using a language processing module. Language processing module may include any hardware and/or software module. Language processing module may be configured to extract, from the one or more documents, one or more words. One or more words may include, without limitation, strings of one or characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by process selection device 104 and/or language processing module to produce associations between one or more words extracted from at least a document and detect associations, including without limitation mathematical associations, between such words, and/or associations of extracted words with categories of physiological data, relationships of such categories to prognostic labels, and/or categories of prognostic labels. Associations between language elements, where language elements include for purposes herein extracted words or phrases, including words or phrases labeling and/or describing one or more alimentary collations and/or elements thereof, include, without limitation, mathematical associations, including without limitation statistical correlations between any language element and any other language element and/or language elements. Statistical correlations and/or mathematical associations may include probabilistic formulas or relationships indicating, for instance, a likelihood that a given first word or phrase is synonymous with and/or typically associated with a given second word or phrase. As a further example, statistical correlations and/or mathematical associations may include probabilistic formulas or relationships indicating a positive and/or negative association between at least an extracted word or phrase and a given alimentary element and/or collation; positive or negative indication may include an indication that a given document is or is not indicating a given alimentary element and/or collation, and/or that the relationship between the word or phrase and the given alimentary element and/or collation is or is not significant. For instance, inclusion of a negating term such as "not" in a sentence correlating a first word with a second word may be analyzed to determine whether that correlation constitutes a positive or negative correlation; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at process selection device 104, or the like.

Still referring to FIG. 1, language processing module and/or process selection device 104 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word category of physiological data, a given relationship of such categories to prognostic labels, and/or a given category of prognostic labels. There may be a finite number of category of physiological data, a given relationship of such categories to prognostic labels, and/or a given category of prognostic labels to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and process selection device 104 may then use such associations to analyze words and/or phrases extracted from one or more documents and determine statistical relationships between such words and/or phrases. Corpus of documents may include, without limitation, any set of textual information described above for alimentary transfer requests and/or alimentary instruction sets, including without limitation menus, descriptions of alimentary collations previously prepared and/or listed on menus, descriptions of one or more alimentary elements and/or processes, or the like. Corpus of documents may include articles, web pages, books and/or book excerpts, or any other source of text associating words and/or phrases as described above to one another. Documents may be entered into process selection device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, such as an international standard book number (ISBN), process selection device 104 may automatically obtain the document using such an identifier, for instance by submitting a request to a database or compendium of documents such as JSTOR as provided by Ithaka Harbors, Inc. of New York.

With continued reference to FIG. 1, process selection device 104 may modify user-selected alimentary transfer request by comparing a requested alimentary collation from selected alimentary transfer request to one or more instructions in alimentary instruction set and determining that at least an element of requested alimentary collation violates one or more instructions of alimentary instruction set. For instance, alimentary instruction set may establish a maximal intake amount of a given nutrient, such as an upper limit on fat or sugar consumption, and requested alimentary collation may include an element and/or ingredient that exceeds that maximal intake amount; for instance, the requested alimentary collation may include a meal having a larger fat content than permitted by alimentary instruction set. In such a situation, process selection device 104 may modify alimentary transfer request to list an alimentary collation that follows the violated alimentary instruction or instructions; a recipe may be modified, for instance, or a first meal description may be replace with a second meal description that complies with alimentary instruction set. Alternatively or additionally, one or more alternative and/or modified alimentary collations may be presented to the user, via user device 108 or the like, along with an entry field such as a checkbox and/or button whereby the user may select one of the presented alternatives. User may be presented with the ability to refuse modification; for instance, user may be provided with an entry field permitting the user to proceed with an unmodified alimentary transfer request.

Alternatively or additionally, and continuing to refer to FIG. 1, process selection device 104 may be configured to receive an alimentary transfer request by receiving, from a constitutional guidance system 116 an alimentary instruction set and generate the alimentary transfer request as a function of the alimentary instruction set; alimentary instruction set may include any alimentary instruction set as described above. For instance, and without limitation, alimentary instruction set may be transmitted to a user via a graphical user interface coupled to user device 108. User may select at least an alimentary instruction from alimentary instruction set by selecting one or more nutritional goals described by the one or more instructions; selection of one or more goals may cause generation of at least a matching alimentary collation and/or ingredient, for instance by reference to collation element database 120 as described above. As an illustrative and non-limiting example, user may select instructions associated with consuming a certain quantity of vegetables, protein, and carbohydrates, as suggested in alimentary instruction set; each selection may prompt generation of a drop-down list of ingredients matching and/or fulfilling the vegetable, protein, and carbohydrate requirements, or selection of all three may be matched to an alimentary collation that is listed in collection element database as fulfilling all three. Selection of individual ingredients may be used to generate one or more matching alimentary collations, which may be performed by using such selections to create a query for collation element database 120, producing a result set representing one or more alimentary collations. In an embodiment, a plurality of alimentary collations generated as described above may be presented to user, permitting user to select an alimentary collation from the plurality. A plurality of alimentary collations may be filtered by comparison of alimentary collations to user history; for instance, alimentary collations frequently and/or previously selected by user may be displayed, where "frequently" selected elements may include elements that have been selected by user more than a threshold number of times in the past, and/or elements that have been selected by the user more than a threshold number of times in a recent period such as a month, quarter, year, or the like Still referring to FIG. 1, history of previous user interactions with system 100 may be stored in and/or retrieved from a user history database 124. User history database 124 may include any database, data store, and/or data structure suitable for use as collection element database as described above.

Referring now to FIG. 3, an exemplary embodiment of a user history database 124 is illustrated. One or more tables in user history database 124 may include a constraint history table 400, which may list past categorical constraints as described in further detail below. User history database 124 may include a collation history table 404, which may list collations previously selected by user according to methods and/or systems as described herein. User history database 124 may include a physical transfer history table 408, which may list one or more physical transfers, as described in further detail below, previously selected by a user.

Alternatively or additionally, and referring again to FIG. 1, process selection device 104 may receive a user request to generate one or more alimentary transfer requests automatically, and automatically generate the one or more alimentary transfer requests. Automatic generation of one or more alimentary transfer requests may be performed by retrieving one or more previously selected alimentary transfer requests from user history database 124. Alternatively or additionally, automatic generation of one or more alimentary transfer requests may be performed using an alimentary instruction set; for instance, one or more suggested or potential alimentary collations may be provided with alimentary instruction set, and/or generated using one or more sets of ingredients specified by and/or meeting instructions of alimentary instruction set. A combination of methods may be used; for instance, process selection device 104 may retrieve a list of potential alimentary collations from alimentary instruction set, based on, for instance the time of day, instructions previously fulfilled by the user, or the like, which may then be filtered and/or ranked according to user history as retrieved from user history database 124. As a further non-limiting example, an initial set of alimentary collations may be listed in user history as retrieved from user history database 124 and may be filtered according to compliance with alimentary instruction set.

Still referring to FIG. 1, additional elements of alimentary transfer request may be generated automatically. For instance, history of past user selections may be used to generate a probable terminal location, which may be set as a terminal location of an alimentary transfer request, and/or presented to a user via user device 108 for confirmation. As a further non-limiting example, a user's current and/or intended location may be received from user device 108, for instance as determined by map programs, satellite navigation facilities such as the Global Positioning System (GPS), cell tower contact and/or triangulation, or the like; for example, user may be navigating according to turn-by-turn directions to a particular location, which may be selected as terminal location. User locations received from user device 108 may be compared to past terminal locations; thus, where current or intended further user location is ambiguous and/or determined only to a low level of accuracy, user history may be matched to detected user location to determine a probable terminal location; any terminal location automatically determined by process selection device 104 may be presented to a user for confirmation.

Continuing to FIG. 1, process selection device 104 may be configured to provide at least categorical constraint modifying the alimentary transfer request, wherein a categorical constraint is described above, in reference to FIG. 2. At least a categorical constraint may include at least a constitutional restriction, defined as any constitutional reason that a user may be unable to engage in an alimentary instruction set process, consume a particular alimentary element, and/or consume a particular alimentary collation; at least a constitutional restriction may include a contraindication such as an injury, a diagnosis such as by an informed advisor including a functional medicine doctor, an allergy or food sensitivity issue, a contraindication due to a medication or supplement that a user may be taking. For example, a user diagnosed with a hypercholesteremia and currently taking a cholesterol lowering medication such as a statin may report a constitutional restriction that includes an inability to consume grapefruit containing foods and food products. At least a constitutional restriction may include a restriction to a diet free of shellfish because of a user's IgE allergic response to shellfish that was diagnosed when a user was a little child. At least a constitutional restriction may include a restriction to a certain diet because of a previously diagnosed medical condition, such as a user who has been previously diagnosed with *Candida* and is following a low sugar diet. At least a constitutional restriction may include a constitutional restriction as a function of a medication, supplementation, and/or medical treatment or therapy that a user may be undergoing. For example, a user currently taking a medication such as metronidazole may generate at least a constitutional restriction to an alcoholic free diet.

Alternatively or additionally, and still referring to FIG. 1, at least a categorical restriction may include a user preference. A user preference may include a request for a particular diet, food, food group, nutrition plan, style of eating, lifestyle, and/or nutrition. At least a user preference may include a request for a particular type of diet such as Atkins, Paleo, Whole 30, gluten free, ketogenic, dairy free, Mediterranean, soy free, and the like. At least a user preference may include elimination of certain foods or food groups because of a dislike for such foods, an allergy to a food, and/or a sensitivity. For example, at least a user preference may include a request for an egg free diet based on a user's aversion to eggs. In yet another non-limiting example, at least a user preference may include a request for a diet free of bell peppers because of a user's previous IgG food sensitivity testing. At least a user preference may include a request for a diet based on religious or moral beliefs such as kosher diet or vegetarian diet. At least a user preference may include a request to eliminate certain food groups such as a nightshade free diet or a grain free diet. At least a user preference may include a request to eliminate certain ingredients that may be commonly found in food such as a request for a diet free of monosodium glutamate (MSG) or corn starch. At least a user preference may include a request for a certain level or quality of ingredients such as locally sourced ingredients, free range meats, wild caught fish, organic produce and the like. At least a user preference may include a user preference based on a certain style of eating that a user prefers, such as low carb, high protein, low fat, and the like.

With continuing reference to FIG. 1, providing the at least a categorical constraint may include receiving the at least a categorical constraint from a user device 108. For instance, and without limitation, user may enter, via a user interface provided on user device 108, one or more user preferences and/or dietary restrictions; as a non-limiting example, the user may be aware that the user is allergic to a particular category of alimentary elements such as nuts, fish, or the like, and may enter that information via user device 108. Alternatively or additionally, providing at least a categorical constraint may include receiving, from a constitutional guidance system 116 an alimentary instruction set and generating the at least a categorical constraint as a function of the alimentary instruction set. For instance, constitutional guidance system 116 may determine based on diagnostic testing and/or procedures that user is diabetic and add to alimentary instruction set that user should not consume sugars. In an embodiment, a dietary restriction may be received from the user, sent to the health guidance system, and used by the health guidance system to generate the nutrition plan. One or more categorical constraints may be stored in and/or retrieved from a user constraint database 128; for instance, providing at least a categorical constraint may include retrieval of at least a categorical constraint from a user constraint database 128. User constraint database 128 may include any database, data store, and/or data structure suitable for use as a collation element database 120 as described above.

Figure 5:
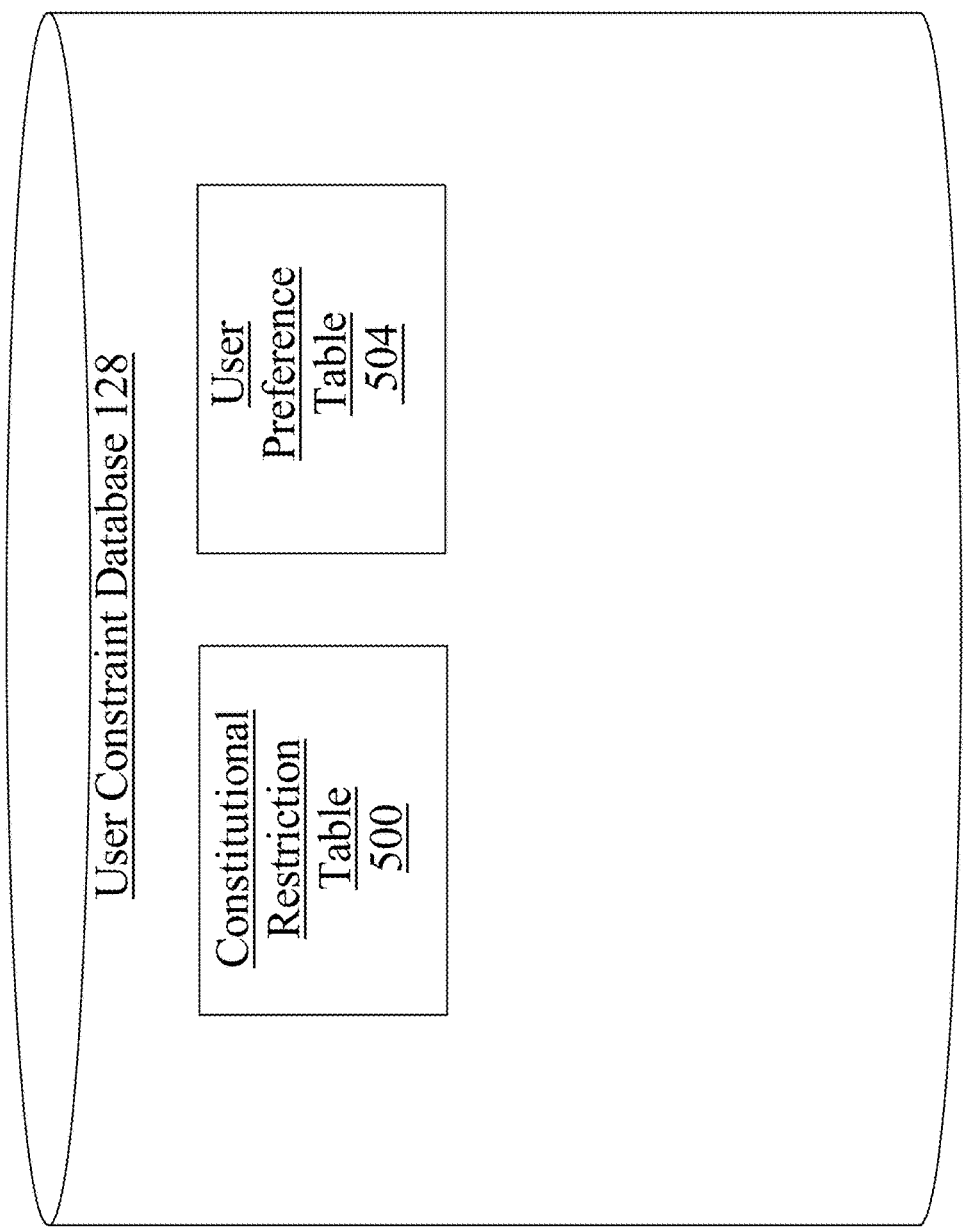
FIG. 5 is a block diagram illustrating an exemplary embodiment of a user constraint database.

Referring now to FIG. 5, one or more tables in user constraint database 128 may include a constitutional restriction table 500, which may be used to list constitutional restrictions, as described above, associated with user. Constraint database 128 may include a user preference table 504, which may be used to list user preferences of aliments. For instance, and without limitation, user preference table 504 may include preferences of salty, sweet, spicy, umami, and the like thereof. As a further non-limiting example user preference table may include specific types of foods such as chicken, steak, pie, cake, cookies, and the like thereof. User preference table 504 may also indicate the diet preferences of an individual, wherein a diet preference may include, without limitation, keto, paleo, atkins, vegan, vegetarian, and the like thereof.

Referring again to FIG. 1, system 100 may include a dietary data database 132; dietary database may include any database or datastore suitable for use as collation element database. In an embodiment, dietary database may list foods compatible with one or more categorical constraints as described below.

Figure 6:
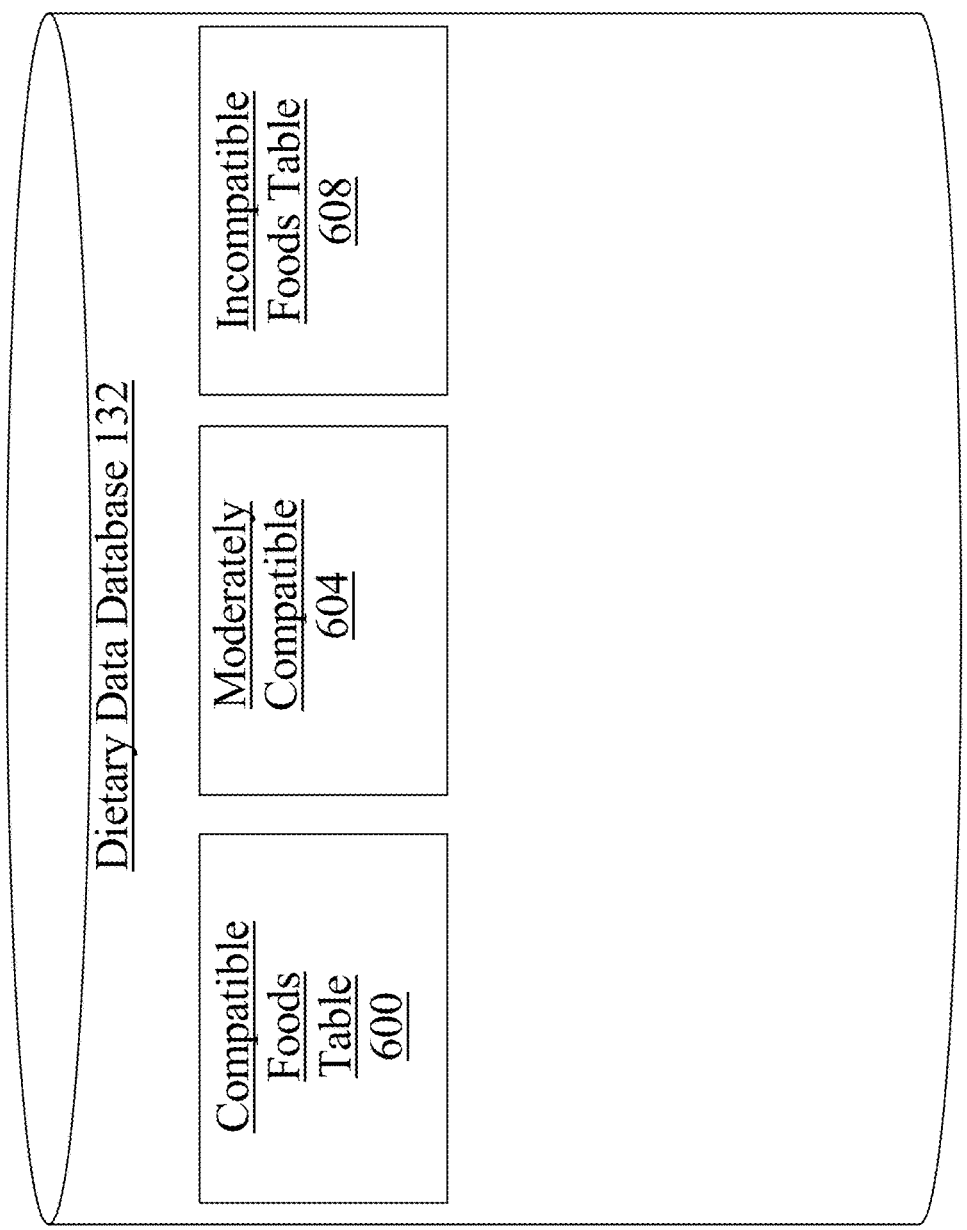
FIG. 6 is a block diagram illustrating an exemplary embodiment of a dietary data database.

Referring now to FIG. 6, one or more database tables in dietary data database 132 may include, as a non-limiting example, a compatible foods table 600. For instance and without limitation, compatible foods table 600 may be a table relating categorical constraints to foods that are compatible with a particular categorical constraint as described in further detail below; for instance where a categorical constraint contains a request for a ketogenic diet foods such as beef tips, ground sirloin and lamb shanks may be compatible with such a request while such foods may not be compatible with a categorical constraint for a vegan diet. Dietary data database 132 may include moderately compatible food table 604 which may be a table relating categorical constraint to foods that are moderately compatible with a particular categorical constraint; for instance where a categorical constraint contains a request for a gluten free diet from a user with a self-reported gluten intolerance, foods such as certified gluten free oats may be moderately compatible with such a user, while certified gluten free oats may not be compatible for a user following a gluten free diet because of a previous diagnosis of Celiac Disease. For instance and without limitation, dietary data database 132 may include as a non-limiting example, incompatible food table 608. For instance and without limitation, incompatible food table 608 may include a table relating categorical constraints to foods that are incompatible with a particular categorical constraint; for instance where a categorical constraint contains a request for a corn free diet ingredients such as cornstarch, corn oil, dextrin, maltodextrin, dextrose, fructose, ethanol, maize, and/or sorbitol may be listed. In an embodiment, database tables contained within dietary data database 132 may include groupings of foods by different categories such as grains, meats, vegetables, fruits, sugars and fats, and the like. In an embodiment, database tables contained within dietary data database 132 may include groups of foods by ingredients that a food may be comprised of, for example gravy may contain flour which may contain gluten.

Referring again to FIG. 1 system 100 includes a descriptor generator module 136 operating on the process selection device 104. Descriptor generator module 136 may include any suitable hardware and/or software module as described in this disclosure. Descriptor generator module 136 is designed and configured to generate a plurality of alimentary transfer descriptors. An alimentary transfer descriptor is an element of data describing (1) an alimentary collation as producible by an entity physically capable of producing alimentary collations, and (2) at least a parameter of a physical transfer process bringing the alimentary collation to the terminal location specified in a corresponding alimentary transfer request. Each alimentary transfer descriptor describes a physical transfer process, of a plurality of physical transfer processes, to be performed by a corresponding physical performance entity 144 of a plurality of physical performance entities. Each alimentary transfer descriptor describes an alimentary collation to be provided during a corresponding physical transfer process. As a non-limiting example, generating the plurality of alimentary transfer descriptors may include receiving, an alimentary collation descriptor from an origin point device 112 as described above, and matching, by the descriptor generator module 136, the alimentary collation descriptor to the alimentary transfer request. Matching may include, without limitation, exact matching; for instance, where origin point device 112 provides an alimentary collation descriptor that is recorded in collation element database 120, such an alimentary collation descriptor may precisely match an alimentary transfer request. Origin point device 112 and/or entities operating them may, for instance, provide ingredient lists to system 100 to permit exact matching. As a further non-limiting example, an origin point device 112 and/or a menu may provide a precise list of ingredients, enabling exact matching of such ingredients to alimentary elements associated in collation element database 120 with an alimentary collation in an alimentary transfer request. As an additional non-limiting example, provided alimentary collation descriptor may match an alimentary collation previously requested and/or received by user; such a previously requested and/or received alimentary collation may be recorded in collation element database 120 and/or user history database 124.

Alternatively or additionally, and still referring to FIG. 1, descriptor generator module 136 may perform one or more estimated and/or inexact matching processes to identify an alimentary collation offered by an origin point device 112 that matches an alimentary collation of alimentary transfer request. Estimated matching may be performed, without limitation, by matching one or more names and/or labels of alimentary collation descriptor received from origin point device 112 with a name of an alimentary collation of alimentary transfer request; matching may be performed using natural language module and/or one or more processes effected thereby, including without limitation vector similarity matching. As a further example, a list of ingredients of an alimentary collation received from an origin point device 112 may be compared to lists of ingredients retrieved from collation element database 120 to detect alimentary collations from the database having more than a threshold number of ingredients in common with the list of ingredients. In an embodiment, alimentary collations received from origin point device 112 may be maintained in an alimentary collation data store 140. For instance, and without limitation, origin point device 112 may transmit to system 100 alimentary collation descriptors and/or associated ingredients, which may be stored in alimentary collation data store 140. Entries in alimentary collation data store 140 may be modified, for instance so that names of ingredients are changed to synonymous names from collation element database 120, for instance as detected using language processing module. Generation of descriptors may therefore include querying alimentary collation data store 140 using at least an alimentary transfer request. Origin point device 112 and/or alimentary collation data store 140 may include temporal limits, such as indications of times of day, days of the week, and/or dates during which a given alimentary collation is available. Alternatively or additionally, descriptor generator module 136 may transmit, to an origin point device 112, an alimentary transfer request.

With continued reference to FIG. 1, descriptor generator module 136 may generate one or physical transfer processes by communicating with one or more physical performance entities. For instance, and without limitation, descriptor generator module 136 may transmit, to each physical performance entity 144 of a plurality of physical performance entities, information describing the alimentary transfer request; information may include, without limitation, an origin point and terminal point. Each physical performance entity 144 may transmit to process selection device 104, path information for one or more vehicles of physical performance entity 144. Path information may include, without limitation, a current location of a vehicle, a current heading or direction of travel of the vehicle, one or more future stops at which the vehicle is currently scheduled to stop, and/or one or more paths the vehicle is likely to travel. In an embodiment, physical performance entity 144 may receive only a request to describe such vehicles, and may send only such path information; alternatively, where descriptor generator module 136 has transmitted origin point and/or terminal point, physical performance entity 144 may send one or more potential paths that one or more vehicles may be able to traverse between origin point and terminal point. In an embodiment, prospective paths may be calculated based on estimated time of production of an alimentary collation; for instance a collation may take 20 minutes from request to be completed, and physical performance entity 144 may estimate likely ability of one or more vehicles to arrive at or near to the time of completion. In an embodiment, time until completion of an alimentary collation is provided by an origin point device 112 corresponding to the entity preparing the alimentary collation; alternatively or additionally, description generator may determine an average amount of time a given alimentary collation takes to be completed at a given entity, and use the determined average amount of time to determine a likely time of completion.

Alternatively or additionally, and still viewing FIG. 1, descriptor generator module 136 136 may generate estimated paths for one or more vehicles given report positions for each of the one or more vehicles, origin point, and terminal location; persons skilled in the art will be aware of various ways in which estimated paths may be generated. A generated path may depend on another generated path; for instance, a potential or selected path from a first origin point to a first terminal point may include at least a segment of a path from a second origin point to a second terminal point, and descriptor generator module 136 may generate potential paths for each assuming that the other path has or has not been chosen. As a non-limiting example, where to potential paths having shared segments are presented to two or more users sharing a terminal point, descriptor generator module 136 may provide the two users with at least an alimentary transfer descriptor including a shared route as a possible selection for the two users.

Continuing to refer to FIG. 1, generation of each alimentary transfer descriptor of at least an alimentary transfer descriptor may include combination of an alimentary collation of at least an alimentary collation identified as described above with a physical transfer process of at least a physical transfer process; this may generate a large number of alimentary transfer descriptors, as each alimentary collation may have multiple potential paths for its delivery, and there may be a large quantity of alimentary collations that may potentially match alimentary transfer request. This initial set of candidates may be chosen within a geographical/travel time threshold; for instance, any path having a length above a threshold amount, a travel time above a threshold amount, and/or a length and/or time exceeding an average travel time and/or length of paths generated by more than a threshold amount. Similarly, origin points more than a threshold geographical distance and/or travel time away from terminal point may be eliminated from generated alimentary transfer descriptors. Each threshold may be established as a default value and/or selected by a user; any threshold may be user specific.

Still referring to FIG. 1, each alimentary transfer descriptor further includes a plurality of attributes, each attribute corresponding to a selection criterion of a plurality of selection criteria. Each attribute may include a degree of variance from an element of alimentary request, which element may be described here for the sake of brevity as a "requested element"; for instance, a first attribute may represent a degree to which an ingredient list differs from a requested ingredient list, a higher number representing a greater number of divergent ingredients, while at least second attribute may represent a degree to which an ingredient list differs from the at least a categorical constraint, and a third attribute may represent a degree to which a physical transfer process of an alimentary transfer descriptor differs from an ideal or optimal travel distance of time. Each degree of variance may include either a degree to which a provided value differs from the requested value, a degree to which the exact variance is unknown, or both; for instance, where not all ingredients are known, a degree of variance from requested ingredients may be estimated based on a typical recipe, and/or assumed to be high. Similarly, a route calculated as a physical transfer process that has a certain travel time, but also a certain degree of uncertainty in that travel time, may be calculated as having a higher degree of variance than a route having a lesser degree of uncertainty from the same travel time. Persons skilled in the art, upon reviewing the entirety of this disclosure, will be aware of various attributes that may be calculated or derived with regard to various elements of alimentary transfer descriptors as compared to various elements of alimentary transfer requests; generally, an attribute may be generated to reflect a degree of variance from any option a user may select regarding any alimentary transfer request.

Continuing to refer to FIG. 1, system 100 includes a selector module 148 operating on the process selection device 104. Selector module 148 may include any suitable hardware module and/or software module as described in this disclosure. Selector module 148 designed and configured to select an alimentary transfer descriptor of the plurality of alimentary transfer descriptors by executing a selection function on the plurality of alimentary transfer descriptors. As used herein, a "selection function" is a function that generates a selection output as a function of the plurality of selection criteria, the plurality of attributes, and the categorical constraint; a "selection output" as used herein is an output that orders a plurality of alimentary transfer descriptors according to a degree of desirability or optimization given selection criteria. As a non-limiting example, selection function may rank all alimentary transfer descriptors according to each attribute, calculate an average ranking across attributes per alimentary transfer descriptor, where average may include any form of average including without limitation arithmetic mean and/or geometric mean, and/or rank all alimentary transfer descriptors according to attribute-wise ranking and/or average ranking. Selection function may, for instance display only a highest-ranking option or a certain number of highest-ranking options to a user; alternatively, selection function may display a plurality, or all options with rankings according to one or more criteria, ordered by average ranking, one or more per-criteria rankings, or any other ranking as described in this disclosure. A user may be able to select which ranking according to which alimentary transfer descriptors are ranked, or a ranking may be selected by default.

In an embodiment, selection function used by process selection device 104 may compare one or more alimentary transfer descriptors to a mathematical expression representing an optimal combination of alimentary provision parameters. Mathematical expression may include a linear combination of parameters, weighted by coefficients representing relative importance of each parameter in generating an optimal alimentary transfer descriptor. For instance, a total transit time in seconds of an alimentary transfer descriptor may be multiplied by a first coefficient representing the importance of total transit time, a total cost of an alimentary transfer descriptor may be multiplied by a second coefficient representing the importance of cost, a degree of variance from an alimentary instruction set may be represented as another parameter, which may be multiplied by another coefficient representing the importance of that parameter, a degree of variance from a requested recipe may be multiplied by an additional coefficient representing an importance of that parameter, and/or a parameter representing a degree of variance from one or more dietary restrictions may be provided a coefficient representing the importance of such a variance; persons skilled in the art, upon reviewing the entirety of this disclosure, will be aware of various parameters that may be weighted by various coefficients. Use of a linear combination is provided only as an illustrative example; other mathematical expressions may alternatively or additionally be used, including without limitation higher-order polynomial expressions or the like.

Still viewing FIG. 1, mathematical expression may represent a cost function, where a "cost function" is an expression an output of which an optimization algorithm minimizes to generate an optimal result. As a non-limiting example, process selection device 104 may calculate parameters of each of a plurality of alimentary transfer descriptors, calculate an output of mathematical expression using the parameters, and select an alimentary transfer descriptor that produces an output having the lowest size, according to a given definition of "size," of the set of outputs representing each of the plurality of alimentary transfer descriptors; size may, for instance, included absolute value, numerical size, or the like. Selection of different cost functions may result in identification of different alimentary transfer descriptors as generating minimal outputs; for instance, where transit time is associated in a first cost function with a large coefficient or weight, an alimentary transfer descriptor having a short transit time may minimize the first cost function, whereas a second cost function wherein transit time has a smaller coefficient but degree of variance from a dietary restriction has a larger coefficient may produce a minimal output for a different alimentary transfer descriptor having a longer transit time but more closely hewing to a dietary restriction.

Alternatively or additionally, and still referring to FIG. 1, each alimentary transfer descriptor may be represented by a mathematical expression having the same form as mathematical expression; process selection device 104 may compare the former to the latter using an error function representing average difference between the two mathematical expressions. Error function may, as a non-limiting example, be calculated using the average difference between coefficients corresponding to each parameter. An alimentary transfer descriptor having a mathematical expression minimizing the error function may be selected, as representing an optimal expression of relative importance of parameters to a system or user. In an embodiment, error function and cost function calculations may be combined; for instance, an alimentary delivery option resulting in a minimal aggregate expression of error function and cost function, such as a simple addition, arithmetic mean, or the like of the error function with the cost function, may be selected, corresponding to an option that minimizes total variance from optimal parameters while simultaneously minimizing a degree of variance from a set of priorities corresponding to alimentary transfer descriptor parameters. Coefficients of mathematical expression and/or cost function may be scaled and/or normalized; this may permit comparison and/or error function calculation to be performed without skewing by varied absolute quantities of numbers.

Still referring to FIG. 1, mathematical expression and/or cost function may be provided by receiving one or more user commands. For instance, and without limitation, a graphical user interface may be provided to user with a set of sliders or other user inputs permitting a user to indicate relative and/or absolute importance of each parameter to the user. Sliders or other inputs may be initialized prior to user entry as equal or may be set to default values based on results of any machine-learning processes or combinations thereof as described in further detail below.

With continued reference to FIG. 1, mathematical expression and/or cost function may be generated using a machine learning to produce cost function. For instance, and without limitation, a linear regression process may be performed to generate a linear function of attributes to be used as a loss function as described above. A machine learning process, as used herein is a process that automatically uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 1, "training data," as used herein, is data containing correlations that a machine-learning process may use to model relationships between two or more categories of data elements. For instance, and without limitation, training data 152 may include a plurality of data entries, each entry representing a set of data elements that were recorded, received, and/or generated together; data elements may be correlated by shared existence in a given data entry, by proximity in a given data entry, or the like. Multiple data entries in training data 152 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 152 according to various correlations; correlations may indicate causative and/or predictive links between categories of data elements, which may be modeled as relationships such as mathematical relationships by machine-learning processes as described in further detail below. Training data 152 may be formatted and/or organized by categories of data elements, for instance by associating data elements with one or more descriptors corresponding to categories of data elements. As a non-limiting example, training data 152 may include data entered in standardized forms by persons or processes, such that entry of a given data element in a given field in a form may be mapped to one or more descriptors of categories. Elements in training data 152 may be linked to descriptors of categories by tags, tokens, or other data elements; for instance, and without limitation, training data 152 may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data 152 may include one or more elements that are not categorized; that is, training data 152 may not be formatted or contain descriptors for some elements of data. Machine-learning algorithms and/or other processes may sort training data 152 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 152 to be made applicable for two or more distinct machine-learning algorithms as described in further detail below.

In an embodiment, and continuing to refer to FIG. 1, training data 152 may be created using a plurality of past user interactions. Past user interactions may include only interactions with a current user; in this case loss function may be user-specific, using a training set composed of past user selections. Such a user-specific training set may initially be seeded using one or more user entries as above. Similarly, user may enter a new command changing mathematical expression, and then subsequent user selections may be used to generate a new training set to modify the new expression. Alternatively or additionally, training data 152 may include past interactions with one or more additional users. One or more additional users may be selected based on similarities to current user; similarities may include, without limitation, one or more similar medical conditions, one or more similar dietary restrictions, one or more demographic similarities, such as age, sex, ethnicity, national origin, language, or the like. As a non-limiting example, selector module 148 may search user history database 124 for users having at least a categorical constraint matching at least a categorical constraint of current user and use history of such users to generate training data 152; this process may alternatively or additionally be used to select all users sharing any other attribute or demographic feature with current user in user history database 124 and generate training data 152 based on such users' histories. Alternatively or additionally, all users may be used. In an embodiment, selector module 148 may generate a machine-learning model using all users or a selected set of users as described above, and then modify the model using additional training using history of current user.

Still referring to FIG. 1, selector module 148 may be designed and configured to create at least a machine-learning model relating inputs representing attributes to a loss function output as described above; for instance, machine-learning model pay present a linear or other mathematical combination of attribute values with weights or other expressions indicating relative importance within the linear or other mathematical combination. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure. Machine-learning may include other regression algorithms, including without limitation polynomial regression.

Continuing to refer to FIG. 1, machine-learning algorithm used to generate machine-learning model may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, selector module 148 may generate loss function using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Figure 7:
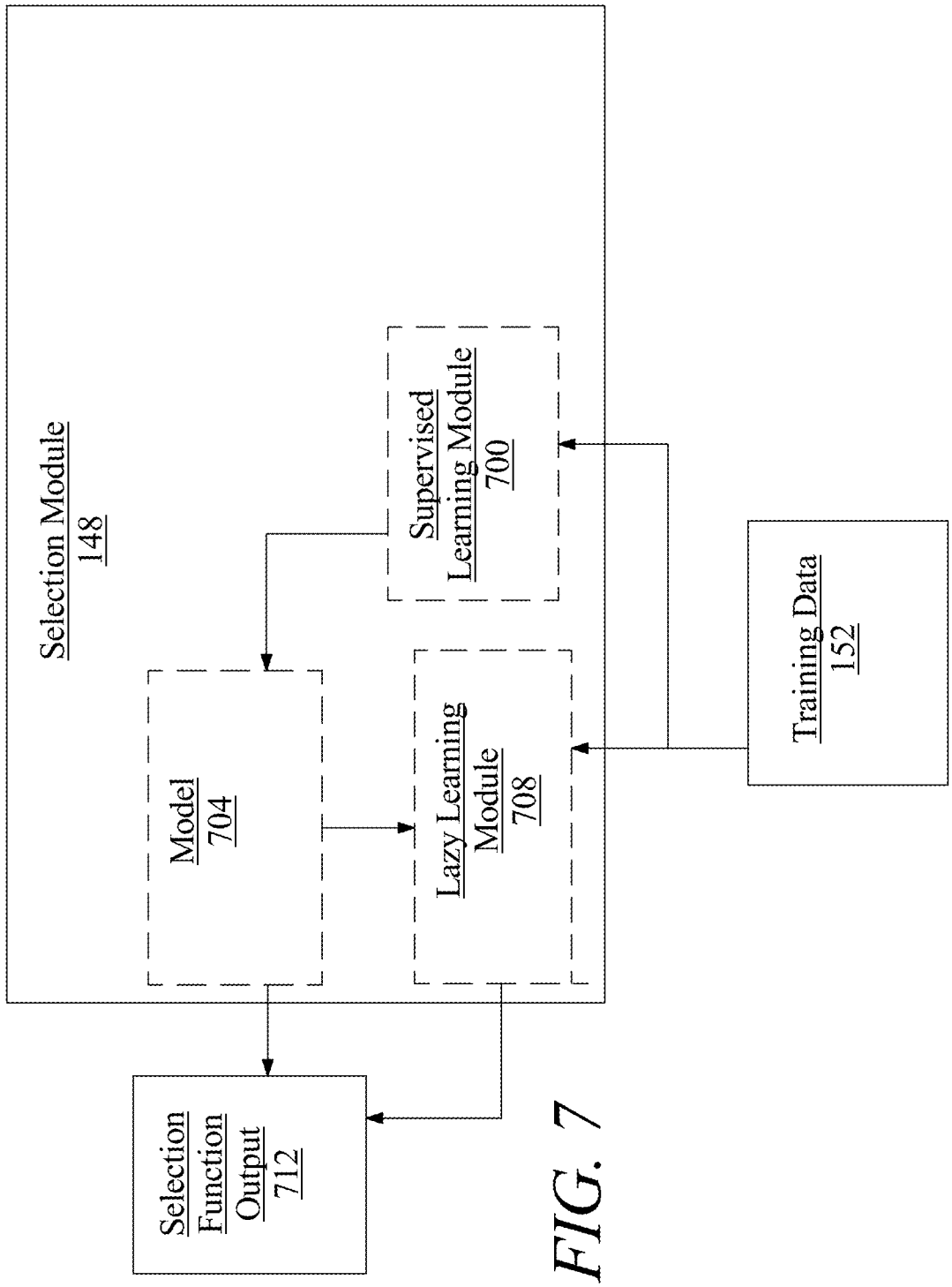
FIG. 7 is a block diagram illustrating an exemplary embodiment of a selection module.

Referring now to FIG. 7, machine-learning algorithms used by selector module 148 may include supervised machine-learning algorithms, which may, as a non-limiting example be executed using a supervised learning module 700 executing on process selection device 104 and/or on another computing device in communication with process selection device 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use attributes as inputs, a loss function output as an output, and a scoring function representing a desired form of relationship to be detected between elements of physiological data and prognostic labels; scoring function may, for instance, seek to minimize the degree of error between generated loss function and results presented in training data 152. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 152. Persons skilled in the art, upon reviewing the entirety of this disclosure, will be aware of various possible variations of supervised machine learning algorithms that may be used to generate a mathematical function or model 704 relating attributes to loss-function outputs.

Still referring to FIG. 7, selector module 148 may alternatively or additionally be designed and configured to generate at least an output selecting an by executing a lazy learning process as a function of the training data 152 and the alimentary transfer request; lazy learning processes may be performed by a lazy learning module 708 executing on process selection device 104 and/or on another computing device in communication with process selection device 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at a prognostic label associated with physiological test sample, using training data 152. As a non-limiting example, an initial heuristic may include a ranking of prognostic labels according to relation to a test type of at least a physiological test sample, one or more categories of physiological data identified in test type of at least a physiological test sample, and/or one or more values detected in at least a physiological test sample; ranking may include, without limitation, ranking according to significance scores of associations between elements of physiological data and prognostic labels, for instance as calculated as described above. Heuristic may include selecting some number of highest-ranking associations and/or prognostic labels. Selector module 148 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate prognostic outputs as described in this disclosure, including without limitation lazy learning applications of machine-learning algorithms as described in further detail below.

In an embodiment, and continuing to refer to FIG. 7, selector module 148 may perform more than one cost function and/or lazy learning process; for instance, while a first cost function and/or lazy learning process may relate all attributes to a selection output, a second cost function and/or lazy learning process may select a most efficient physical transfer route, which in turn may be used to score route efficiencies and be input to a more global cost function, for instance by presenting to the more global cost function a list of alimentary transfer descriptors with optimal routes. Alternatively or additionally, a current user may specify one or more attributes according to which that user wishes a selection function to be performed, eliminating use of other attributes to derive and/or perform selection function. Selection function output 712 may be generated by any of the above-described processes, models, and/or modules, or any combination thereof. Persons skilled in the art, upon reviewing the entirety of this disclosure, will be aware of various ways in which selection functions may be generated and/or customized to produce selection outputs as described in this disclosure.

In an embodiment, and now referring to FIG. 1, selector module 148 is designed and configured to select the alimentary transfer descriptor based on the selection output. Selection may include selection of an alimentary transfer descriptor having a highest-ranked selection function output, such as an alimentary transfer descriptor having the lowest loss function output. Selection may include presentation of two or more alimentary transfer descriptors to a user via user device 108, for instance as described above, and receiving a user selection of one of the two or more alimentary transfer descriptors; two or more alimentary transfer descriptors may be ranked according to one or more selection function outputs as described above. Display of alimentary transfer descriptors may include display of all generated alimentary transfer descriptors; alternatively or additionally a smaller subset of the generated alimentary transfer descriptors may be displayed. A smaller subset may be selected according to any process for selecting a smaller subset as described herein, including without limitation selection of a number of alimentary transfer descriptions associated with highest-ranked or most optimal selection function outputs; for instance, where selection function is or includes a loss function, selection may include selection of a set of alimentary transfer descriptors having the smallest loss function outputs. A number of alimentary transfer descriptors having minimal loss function outputs and/or highest ranking selection function outputs may be set according to a number stored in memory of process selection device 104; the number may be set by a user, who may be permitted to request selection of any number of alimentary transfer descriptors to be displayed. Alternatively or additionally, the number may be set by default; a user entry may modify number from default to another value.

Still referring to FIG. 1, process selection device 104 is designed and configured to transmit a selected alimentary transfer descriptor to a physical performance entity 144 corresponding to the selected alimentary transfer descriptor. Transmitting alimentary transfer descriptor to a physical performance entity 144 may include transmitting sufficient data for the physical performance entity 144 to perform the corresponding process, including without limitation transmitting an element of data indicating selection of a physical transfer process previously sent from physical performance entity 144, transmitting an origin point, terminal point, and/or pickup time, or the like. For instance, and without limitation, physical performance entity 144 may generate its own navigation directions given an origin point and terminal point. Transmission may further include transmission to an origin point device 112, for instance to instruct an entity operating the origin point device 112 to prepare or produce an alimentary collation as instructed by selected alimentary transfer descriptor.

Figure 8:
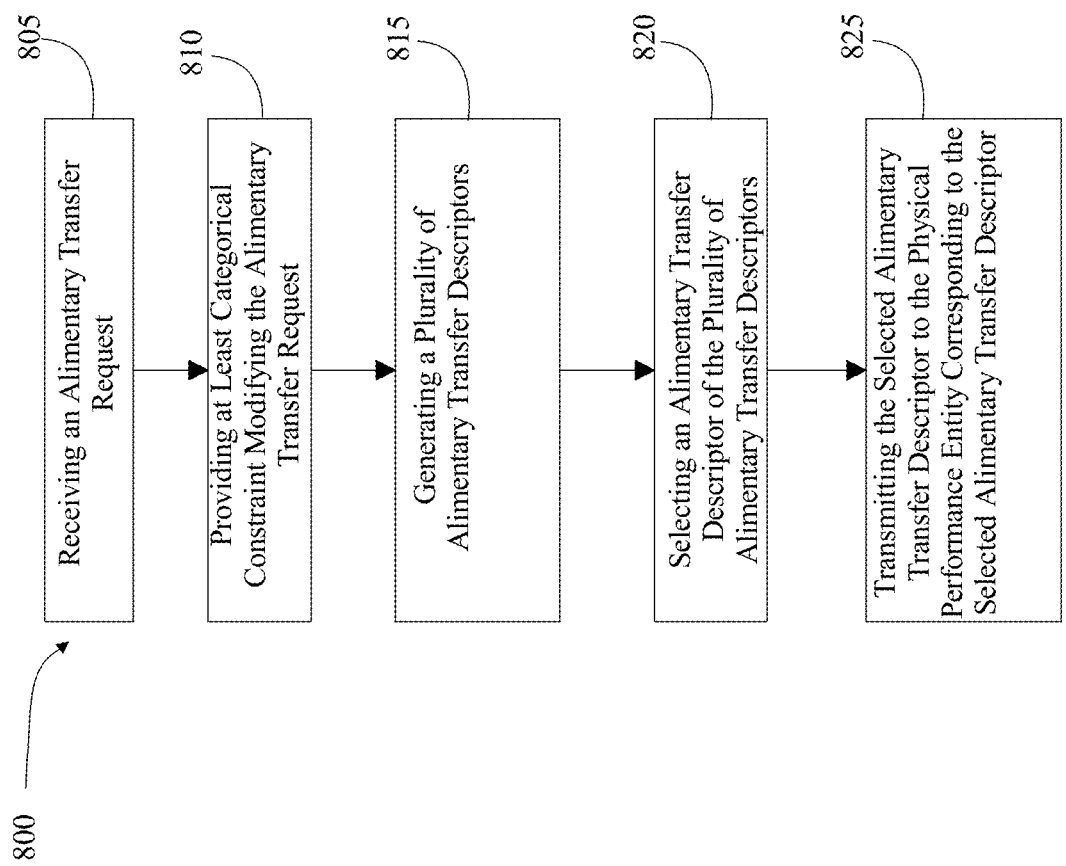
FIG. 8 is a flow diagram illustrating an exemplary embodiment of a method of selecting an alimentary transfer descriptor using categorical constraints.

Referring now to FIG. 8, an exemplary embodiment of a method 800 of selecting an alimentary transfer descriptor using categorical constraints is illustrated. At step 805, a process selection device 104 receives, an alimentary transfer request including at least a description of an alimentary collation and at least a terminal location; this may be implemented, for instance, as described above in reference to FIGS. 1-7. Receiving the alimentary transfer request further comprises receiving, from a user device 108, the alimentary transfer request, for instance as described above in reference to FIGS. 1-7. Process selection device may receive, from a constitutional guidance system 116, an alimentary instruction set and modify the alimentary collation as a function of the alimentary instruction set, for instance as described above in reference to FIGS. 1-7. Receiving the alimentary transfer request may include receiving, from a constitutional guidance system 116 an alimentary instruction set and generating the alimentary transfer request as a function of the alimentary instruction set, for example as described above in reference to FIGS. 1-7. Process selection device 104 may further receive a user selection of at least an alimentary instruction of the alimentary instruction set and generate the alimentary transfer request as a function of the user selection of the at least an alimentary instruction, for instance as described above in reference to FIGS. 1-7.

At step 810, and still referring to FIG. 8, process selection device 104 provides at least categorical constraint modifying the alimentary transfer request; this may be implemented as described above in reference to FIGS. 1-7. Providing at least a categorical constraint may include receiving the at least a categorical constraint from a user device 108, for instance as described above in reference to FIGS. 1-7. Providing at least a categorical constraint may include receiving, from a constitutional guidance system 116 an alimentary instruction set and generating the at least a categorical constraint as a function of the alimentary instruction set, for instance as described above in reference to FIGS. 1-7.

At step 815, and still referring to FIG. 8, process selection device generates a plurality of alimentary transfer descriptors, wherein each alimentary transfer descriptor describes a physical transfer process, of a plurality of physical transfer processes, to be performed by a corresponding physical performance entity of a plurality of physical performance entities, each alimentary transfer descriptor describes an alimentary collation to be provided during a corresponding physical transfer process, and each alimentary transfer descriptor further includes a plurality of attributes, each attribute corresponding to a selection criterion of a plurality of selection criteria; this may be implemented as described above in reference to FIGS. 1-7. Generating the plurality of alimentary transfer descriptors further comprises receiving, from an origin point device 112, an alimentary collation descriptor, and matching, by the process selection device 104, the alimentary collation descriptor to the alimentary transfer request, for instance as described above in reference to FIGS. 1-7.

At step 820, and still referring to FIG. 8, process selection device 104 selects, an alimentary transfer descriptor of the plurality of alimentary transfer descriptors, for instance as described above in reference to FIGS. 1-7. Selecting may include executing a selection function on the plurality of alimentary transfer descriptors, wherein the selection function generates a selection output as a function of the plurality of selection criteria, the plurality of attributes, and the categorical constraint, for instance as described above in reference to FIGS. 1-7. Executing the selection function may include executing a loss function of the plurality of attributes, for instance as described above in reference to FIGS. 1-7. Process selection device 104 may further provide training data based on at least a past user interaction and generate the loss function using a machine learning algorithm as a function of the training data, for instance as described above in reference to FIGS. 1-7. Selection of alimentary transfer descriptor further includes selecting the alimentary transfer descriptor based on the selection output At step 825, and still referring to FIG. 8, process selection device 104 transmits selected alimentary transfer descriptor to the physical performance entity corresponding to the selected alimentary transfer descriptor, for instance as described above in reference to FIGS. 1-7.

Figure 9:
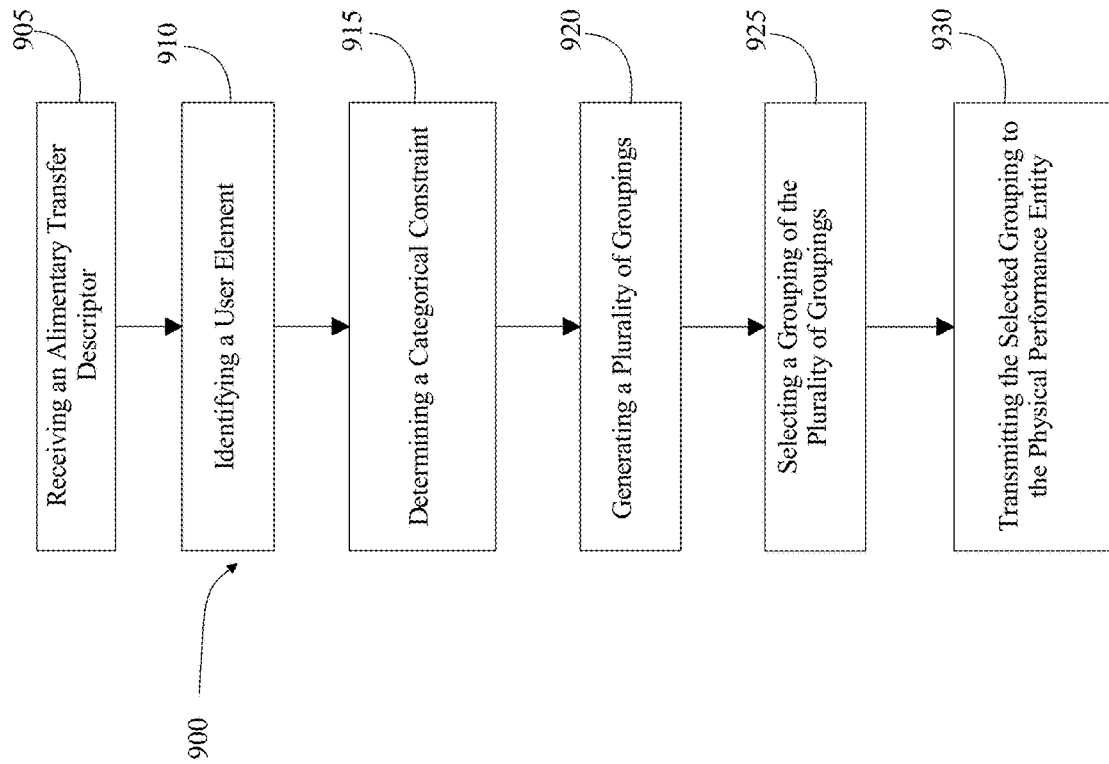
FIG. 9 is a flow diagram illustrating an exemplary embodiment of a method of grouping alimentary transfer descriptors as a function of user elements.

Referring now to FIG. 9, exemplary embodiment of a method 900 of grouping alimentary transfer descriptors using user elements is illustrated. At step 905, a process selection device 104 receives at least an alimentary transfer descriptor 204 as a function of an alimentary transfer request 208; this may be implemented, without limitation, as described above in reference to FIGS. 1-8. At step 910, the process selection device 104 identifies at least a user element 212; this may be implemented, without limitation, as described above in reference to FIGS. 1-8. At step 915, process selection device 104 determines a categorical constraint 216 as a function of the user element 216; this may be implemented, without limitation, as described above in reference to FIGS. 1-8. At step 920, process selection device 104 generates a plurality of groupings 220, wherein each grouping comprises alimentary transfer descriptors; this may be implemented, without limitation, as described above in reference to FIGS. 1-8. At step 925, process selection device 104 selects a grouping based on a selection function 232, wherein the selection function generates a selection output 236; this may be implemented, without limitation, as described above in reference to FIGS. 1-8. At step 930, process selection device 104 transmits a notification 228 to a physical performance entity 144 as a function of the selected grouping; this may be implemented, without limitation, as described above in reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
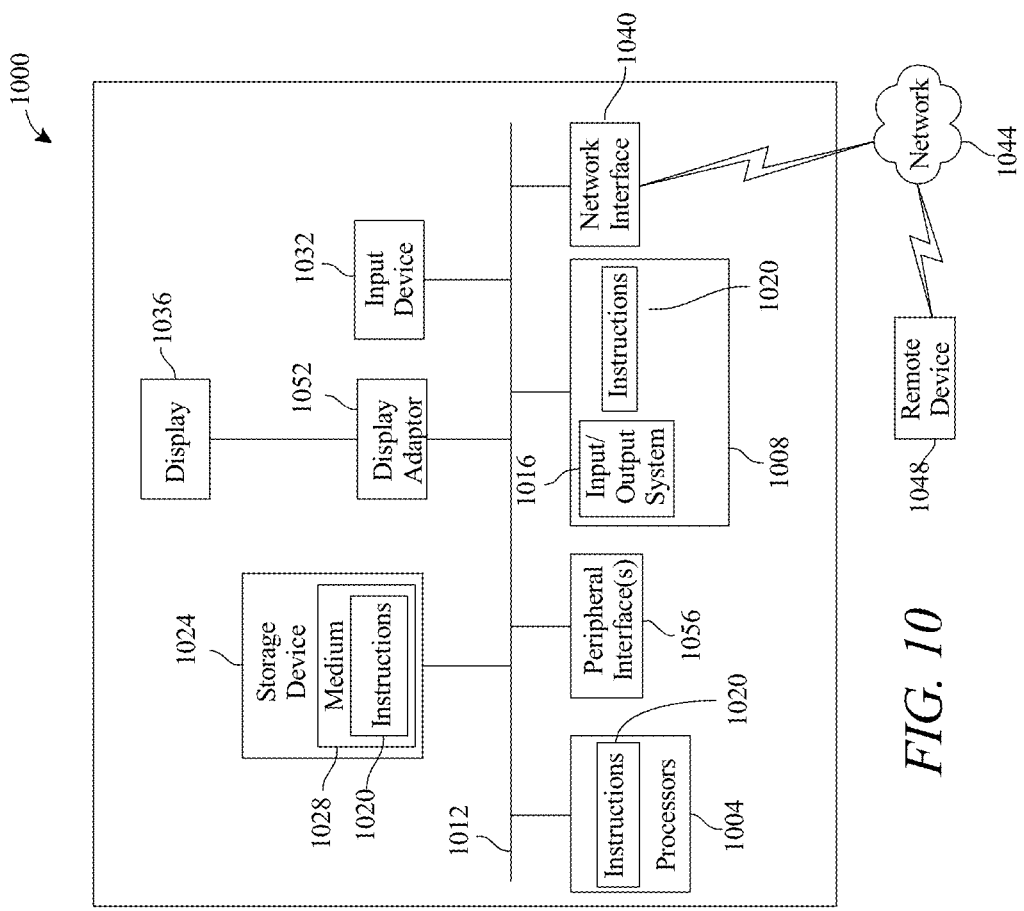
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the instant disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for grouping alimentary transfer descriptors as a function of user elements, the system comprising:
   a process selection device, the process selection device designed and configured to:
   receive at least an alimentary transfer descriptor as a function of an alimentary transfer request:
   identify at least a user element, determine a categorical constraint as a function of the user element; and
   generate a plurality of groupings, wherein generating the plurality of groupings comprises:
   determining a similarity qualifier as a function of the categorical constraint;
   training a grouping machine learning model as a function of training data and a machine learning algorithm, wherein the training data includes a grouping training set that correlates similarity qualifiers and grouping elements; and
   generating, using the trained machine learning model, the plurality of groupings as a function of the similarity qualifier;
   wherein each grouping comprises alimentary transfer descriptors;
   a descriptor generator module operating on the process selection device, the descriptor generator module designed and configured to generate a plurality of alimentary transfer descriptors as a function of the categorical constraint, wherein:
   each alimentary transfer descriptor describes a physical transfer process, of a plurality of physical transfer processes, to be performed by a corresponding physical performance entity of a plurality of physical performance entities;
   each alimentary transfer descriptor describes an alimentary collation to be provided during a corresponding physical transfer process; and
   each alimentary transfer descriptor further includes a plurality of attributes, each attribute corresponding to a selection criterion of a plurality of selection criteria; and
   a notifier module operating on the process selection device, the notifier module designed and configured to transmit a notification to the physical performance entities, wherein transmitting further comprises:
executing a selection function on the plurality of groupings, wherein the selection function generates a selection output as a function of the plurality of selection criteria and the plurality of groupings;
selecting the grouping based on the selection output; and
transmitting the notification to a physical performance entity as a function of the selected grouping.

2. The system of claim 1, wherein the alimentary transfer descriptor comprises at least a description of an alimentary collation and at least a terminal location.

3. The system of claim 1, wherein the process selection device is further configured to receive a user selection and generate the alimentary transfer request as a function of the user selection.

4. The system of claim 1, wherein identifying the user element further comprises:
receiving at least a vital input from a monitoring device;
determining a vital vector as a function of the at least vital input; and
identifying the user element as a function of the vital vector and a vital machine-learning model.

5. The system of claim 1, wherein determining the categorical constraint further comprises:
determining at least a categorical qualifier as a function of the user element; and
generating the categorical constraint as a function of the categorical deficiency and at least a categorical machine-learning model, wherein the categorical machine-learning model is trained as a function of a categorical training set that at least relates a categorical qualifier to the categorical constraint.

6. The system of claim 5, wherein the categorical machine-learning model includes at least an unsupervised algorithm.

7. The system of claim 5, wherein the categorical machine-learning model includes at least a supervised algorithm.

8. The system of claim 1, wherein the grouping machine-learning model includes at least an unsupervised algorithm.

9. The system of claim 1, wherein the grouping machine-learning model includes at least a supervised algorithm.

10. A method for grouping alimentary transfer descriptors as a function of user elements, the method comprising:
receiving, by a process selection device, at least an alimentary transfer descriptor as a function of an alimentary transfer request;
identifying, by the process selection device, at least a user element;
determining, by the process selection device, a categorical constraint as a function of the user element;
generating, by the process selection device, a plurality of groupings, wherein each grouping comprises alimentary transfer descriptors;
selecting, by the process selection device, a grouping of the plurality of groupings, wherein generating the plurality of groupings comprises:

determining a similarity qualifier as a function of the categorical constraint;
training a grouping machine learning model as a function of training data and a machine learning algorithm, wherein the training data includes a grouping training set that correlates similarity qualifiers and grouping elements; and
generating, using the trained machine learning model, the plurality of groupings as a function of the similarity qualifier;
wherein selecting further comprises:
executing a selection function on the plurality of groupings, wherein the selection function generates a selection output as a function of the plurality of selection criteria and the plurality of groupings; and
selecting the grouping based on the selection output; and
transmitting, by the process selection device, a notification to a physical performance entity as a function of the selected grouping.

11. The method of claim 10, wherein the alimentary transfer descriptor comprises at least a description of an alimentary collation and at least a terminal location.

12. The method of claim 10, wherein the method further comprises receiving a user selection and generating the alimentary transfer request as a function of the user selection.

13. The method of claim 10, wherein identifying the user element further comprises:
receiving at least a vital input from a monitoring device;
determining a vital vector as a function of the at least vital input; and
identifying the user element as a function of the vital vector and a vital machine-learning model.

14. The method of claim 10, wherein determining the categorical constraint further comprises:
determining at least a categorical qualifier as a function of the user element; and
generating the categorical constraint as a function of the categorical deficiency and at least a categorical machine-learning model, wherein the categorical machine-learning model is trained as a function of a categorical training set that at least relates a categorical qualifier to the categorical constraint.

15. The method of claim 14, wherein the categorical machine-learning model includes at least an unsupervised algorithm.

16. The method of claim 14, wherein the categorical machine-learning model includes at least a supervised algorithm.

17. The method of claim 10, wherein the grouping machine-learning model includes at least an unsupervised algorithm.

18. The method of claim 10, wherein the grouping machine-learning model includes at least a supervised algorithm.

* * * * *